(12) United States Patent
Urbach et al.

(10) Patent No.: US 10,981,592 B2
(45) Date of Patent: Apr. 20, 2021

(54) BALL NUT ASSEMBLY FOR A POWER STEERING ASSEMBLY OF A VEHICLE

(71) Applicant: TRW Automotive U.S. LLC, Livonia, MI (US)

(72) Inventors: Brian A. Urbach, Rochester Hills, MI (US); John F. Santori, Shelby Township, MI (US)

(73) Assignee: ZF Active Safety and Electronics US LLC, Livonia, MI (US)

( * ) Notice: Subject to any disclaimer, the term of this patent is extended or adjusted under 35 U.S.C. 154(b) by 288 days.

(21) Appl. No.: 16/208,918

(22) Filed: Dec. 4, 2018

(65) Prior Publication Data
US 2019/0168800 A1 Jun. 6, 2019

Related U.S. Application Data

(60) Provisional application No. 62/594,591, filed on Dec. 5, 2017.

(51) Int. Cl.
*B62D 5/04* (2006.01)
*F16H 25/24* (2006.01)
*F16H 25/22* (2006.01)

(52) U.S. Cl.
CPC ......... *B62D 5/0448* (2013.01); *B62D 5/0424* (2013.01); *F16H 25/24* (2013.01); *F16H 25/2204* (2013.01); *F16H 2025/2445* (2013.01)

(58) Field of Classification Search
CPC ..... B62D 5/0448; B62D 5/0424; F16H 25/24; F16H 2025/2445
See application file for complete search history.

(56) References Cited

U.S. PATENT DOCUMENTS

| | | | |
|---|---|---|---|
| 5,590,565 A * | 1/1997 | Palfenier | B62D 1/181 74/493 |
| 6,378,646 B1 * | 4/2002 | Bugosh | B62D 5/0427 180/444 |
| 7,055,646 B2 | 6/2006 | Bugosh | |
| 8,307,940 B2 * | 11/2012 | Bugosh | B62D 5/0448 180/444 |

(Continued)

FOREIGN PATENT DOCUMENTS

| | | | | |
|---|---|---|---|---|
| DE | 2131593 A1 * | 12/1972 | | F16C 35/045 |
| DE | 102009020554 A1 * | 11/2010 | | F16H 25/24 |

(Continued)

OTHER PUBLICATIONS

Machine language translation of (DE-102009020554-A1) from www.espacenet.com on Oct. 19, 2020.*

(Continued)

*Primary Examiner* — Ruth Ilan
*Assistant Examiner* — Myles A Harris
(74) *Attorney, Agent, or Firm* — Robert James Harwood

(57) ABSTRACT

A power steering assembly has a housing and a ball nut assembly supported on the housing. The ball nut assembly has a ball nut axis. The housing has a first surface between the housing and the ball nut assembly. The ball nut assembly also has a second surface. The second surface rotates on the first surface such that the ball nut assembly rotates relative to the housing on a rotation axis that is transverse to the ball nut axis.

22 Claims, 5 Drawing Sheets

(56) References Cited

U.S. PATENT DOCUMENTS

2003/0192734 A1* 10/2003 Bugosh ............... B62D 5/0424
180/444

FOREIGN PATENT DOCUMENTS

EP          2465752 A1 *  6/2012   ............ F16C 33/586
WO    WO-03076832 A1 *  9/2003   ............. F16H 25/24

OTHER PUBLICATIONS

Machine language translation of (WO-03076832-A1) obtained from www.espacenet.com on Oct. 19, 2020.*
Machine language translation of (DE-2131593-A1) obtained from www.espacenet.com on Oct. 19, 2020.*

* cited by examiner

BALL NUT ASSEMBLY FOR A POWER STEERING ASSEMBLY OF A VEHICLE

BACKGROUND OF INVENTION

This invention relates in general to power steering assemblies for vehicles and in particular to an improved ball nut assembly of such a power steering assembly.

An automotive vehicle typically includes a power steering assembly to assist in turning steerable wheels of the vehicle. The power steering assembly may include a rack and pinion assembly to convert rotational movement of a steering wheel into linear movement of a steering member. The linear movement of the steering member then turns the steerable wheels. A ball nut assembly may be mounted on the steering member and operably connected to a power source. The power source and ball nut assembly together assist in the linear movement of the steering member in response to rotation of the steering wheel.

The power steering assembly includes a housing for its components. The housing may comprise individual housings that are joined together. For example, the individual housings may be a pinion housing and an outboard housing that are joined together. However, tolerances allowed for casting and machining of the individual housings may result in their misalignment when joined together. The misalignment may result in the ball nut assembly binding, which increases internal friction for the power steering assembly. Thus, it would be desirable to reduce binding in the ball nut assembly due to misalignment of the individual housings.

SUMMARY OF INVENTION

This invention relates to an improved ball nut assembly of a power steering assembly for a vehicle.

According to one embodiment, a power steering assembly may comprise, individually and/or in combination, one or more of the following features: a housing and a ball nut assembly supported on the housing. The ball nut assembly has a ball nut axis. A first surface is between the housing and the ball nut assembly. The ball nut assembly has a second surface. The second surface rotates relative to the housing on the first surface such that the ball nut assembly rotates on a rotation axis that is transverse to the ball nut axis.

According to this embodiment, the first surface is on the housing.

According to this embodiment, the power steering assembly further comprises a housing insert between the housing and the ball nut assembly. The first surface is on the housing insert.

According to this embodiment, the housing insert has an outer surface that is parallel to the ball nut axis.

According to this embodiment, the first surface has a concave section in a direction of the ball nut axis, the concave section faces the ball nut axis, the second surface has a convex section in the direction of the ball nut axis, and the convex section faces away from the ball nut axis.

According to this embodiment, the second surface rotates between first and second stop surfaces.

According to this embodiment, a polymer bearing is between the first and second surfaces.

According to this embodiment, the ball nut assembly includes a bearing assembly that supports the ball nut assembly on the housing and has the second surface.

According to this embodiment, the bearing assembly comprises a housing insert and an outer surface of the housing insert. The first surface is on the housing insert. The outer surface is parallel to the ball nut axis.

According to this embodiment, the bearing assembly comprises an outer race member having the second surface, a first race in the outer race member, a second race in the ball nut assembly, and force transmitting members between the first and second races.

According to this embodiment, the bearing assembly comprises an outer race member having the second surface, a first race in the outer race member, an inner race member secured to a ball nut of the ball nut assembly, a second race in the inner race member, and force transmitting members between the first and second races.

According to this embodiment, the ball nut axis and rotation axis are perpendicular.

According to this embodiment, the housing is rotationally fixed on the rotation axis.

According to another embodiment, a power steering assembly may comprise, individually and/or in combination, one or more of the following features: a housing, a ball nut assembly having a ball nut axis, and a bearing assembly supporting the ball nut assembly on the housing. An annular first surface is between the housing and the ball nut assembly. The bearing assembly has an annular second surface. The second surface rotates on the first surface such that the ball nut assembly rotates relative to the housing on a rotation axis that is transverse to the ball nut axis. A steering member extends along the ball nut axis and has a rack portion and a screw portion. The ball nut assembly is operatively connected to the screw portion. A pinion is operatively connected to the rack portion and a pulley assembly operatively connects a power source to the ball nut assembly. The ball nut assembly effects linear movement of the steering member.

According to this embodiment, the first surface has a concave section in a direction of the ball nut axis, the concave section faces the ball nut axis, the second surface has a convex section in the direction of the ball nut axis, and the convex section faces away from the ball nut axis.

According to this embodiment, the second surface rotates between first and second stop surfaces.

According to this embodiment, a polymer bearing is between the first and second surfaces.

According to this embodiment, the bearing assembly comprises an outer race member having the second surface, a first race in the outer race member, a second race in the ball nut assembly, and force transmitting members between the first and second races.

According to this embodiment, the first surface is on the housing.

According to this embodiment, the bearing assembly further comprises a housing insert and an outer surface of the housing insert. The first surface is on the housing insert. The outer surface is parallel to the ball nut axis.

One or more potential and/or realized advantages of an embodiment of the power steering assembly include a reduction of binding for the ball nut assembly.

DETAILED DESCRIPTION OF THE PREFERRED EMBODIMENTS

Figure 1:
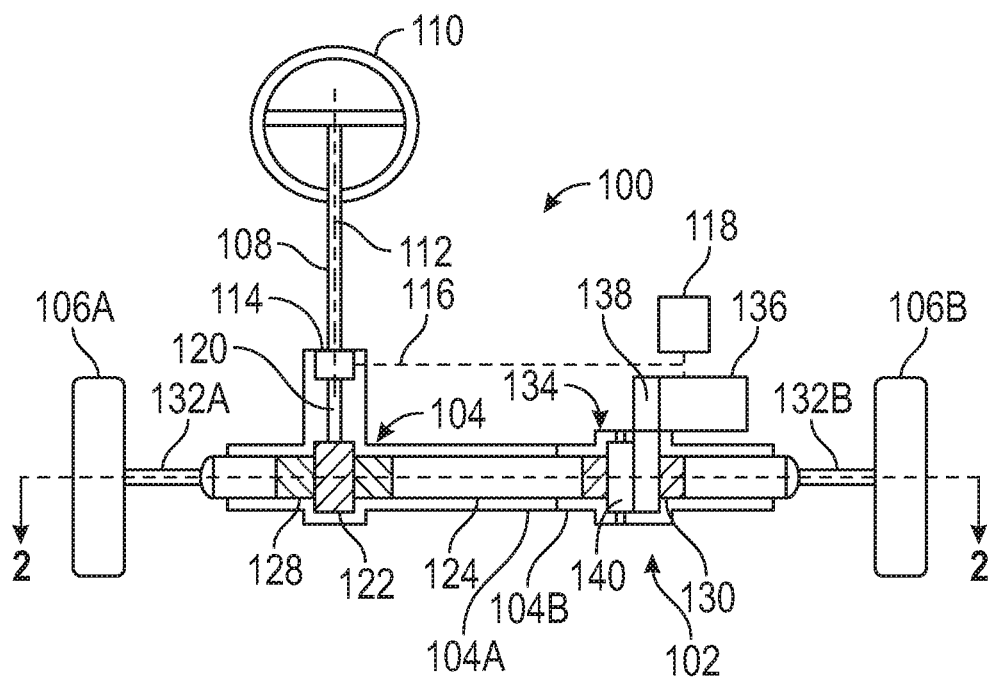
FIG. 1 is a schematic view of a power steering assembly having a first embodiment of a ball nut assembly in accordance with the present invention.
Figure 2:
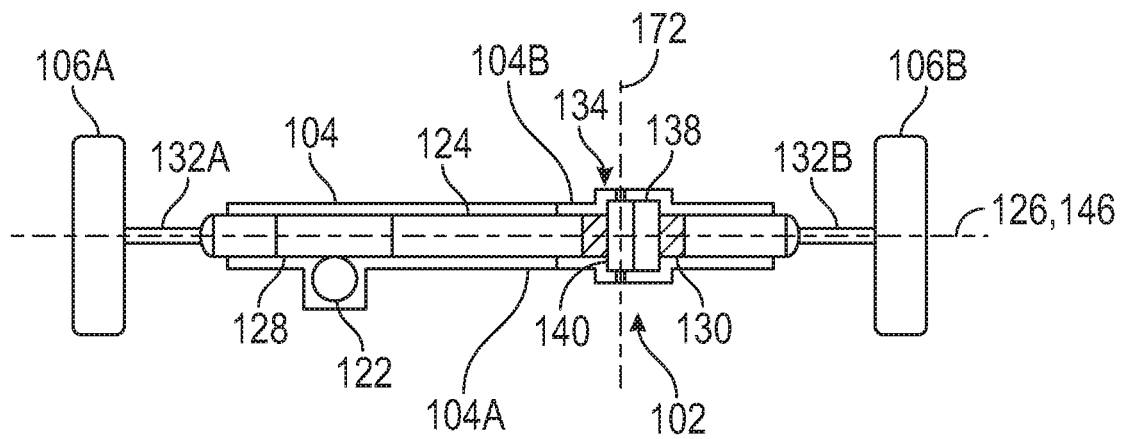
FIG. 2 is a horizontal section view of the power steering assembly of FIG. 1 taken along line 2-2.

Referring now to FIGS. 1 and 2, there is schematically illustrated a power steering assembly, indicated generally at 100, for a vehicle. The power steering assembly 100 has a first embodiment of a ball nut assembly, indicated generally at 102, produced in accordance with the present invention.

The general structure and operation of the power steering assembly 100 is conventional in the art. For example, the power steering assembly 100 may be as disclosed by U.S. Pat. No. 8,307,940 to Bugosh et al. or U.S. Pat. No. 7,055,646 to Bugosh, the disclosures of both of which are hereby incorporated by reference in entirety herein. Thus, only those portions of the power steering assembly 100 which are necessary for a full understanding of this invention will be explained and illustrated in detail. Although this invention will be described and illustrated in connection with the particular power steering assembly 100 disclosed herein, it will be appreciated that this invention may be used in connection with other types of power steering assemblies, including other electric, hydraulic, or otherwise powered power steering assemblies known to those skilled in the art.

As will be discussed, components of the power steering assembly 100, including the ball nut assembly 102, are housed within a housing, indicated generally at 104. As illustrated, the housing 104 comprises first and second individual housings 104A and 104B, respectively, that have been joined together to form the housing 104. The first and second individual housings 104A and 104B, respectively, are joined together by a known means. As non-limiting examples, the first and second individual housings 104A and 104B, respectively, may be joined together by a press fit, welding, bolts, or screws. Alternatively, the housing 104 may comprise more than the two individual housings illustrated. Alternatively, the ball nut assembly 102 may be utilized with the housing 104 when the housing 104 is a single, unitary housing not comprised of individual housings.

The power steering assembly 100 is associated with first and second steerable wheels 106A and 106B, respectively, of a vehicle and includes a rotatable input shaft 108. A vehicle steering wheel or input 110 is operatively coupled to the input shaft 108 for rotation therewith about a steering axis 112. A torque sensor 114 is located within the housing 104. The torque sensor 114 encircles the input shaft 108 and generates signals in response to rotation of the input shaft 108. The signals are transmitted over a data network 116 to an electronic control unit (ECU) 118. The signals indicate a direction and magnitude of steering torque applied to the steering wheel 110.

A torsion bar 120 connects the input shaft 108 to a pinion 122 located inside the housing 104. The torsion bar 120 twists in response to the steering torque applied to the steering wheel 110. When the torsion bar 120 twists, relative rotation occurs between the input shaft 108 and the pinion 122.

A linearly moveable steering member 124 is at least partially in, and extends axially through, the housing 104. The steering member 124 is linearly (or axially) between the first and second steerable wheels 106A and 106B, respectively. A rack portion 128 of the steering member 124 is provided with a series of rack teeth which meshingly engage gear teeth provided on the pinion 122 to operatively connect the pinion 122 and the rack portion 128. The steering member 124 further includes a screw portion 130 having an external screw thread convolution.

The steering member 124 is connected to the first steerable wheel 106A by a first tie rod 132A and the second steerable wheel 106B by a second tie rod 132B. The first and second tie rods 132A and 132B, respectively, are located at distal ends of the steering member 124. The steering member 124 and the first and second tie rods 132A and 132B, respectively, are moveable relative to the housing 104. The linear movement of the steering member 124 along a housing design axis 126 results in steering movement of the first and second steerable wheels 106A and 106B, respectively, in a known manner. The housing design axis 126 is an axis the housing 104 is designed to align with. However, allowable tolerances allow an as-built axis (not shown) of the housing 104 to deviate from the housing design axis 126.

The ball nut assembly 102 is housed in the housing 104 and includes a bearing assembly, indicated generally at 134. The ball nut assembly 102 is supported on the housing 104 by the bearing assembly 134. Preferably, the bearing assembly 134 is a four point bearing having an annular structure around the steering member 124. The bearing assembly 134 will be discussed further with reference to FIGS. 3 and 4.

The power steering assembly 100 further includes a power source 136 drivably connected to the ball nut assembly 102. The power source 136 is illustrated as an electric motor, hut may be other than an electric motor. As a non-limiting example, the power source 136 may be a hydraulic system. The ECU 118 controls the power source 136 in accordance with the signals received from the torque sensor 114. Control signals for the power source 136 are transmitted from the ECU 118 to the power source 136 via the data network 116.

The illustrated power source 136 and the ball nut assembly 102 are operatively connected by a pulley assembly 138 that includes a belt transmitting rotational power between an output of the power source 136 and a ball nut 140 of the ball nut assembly 102. The pulley assembly 138 includes a pulley 142 (shown in FIG. 3) that is rotated by the belt and rotationally fixed to a ball nut 140 of the ball nut assembly 102. Alternatively, the power source 136 may be operatively connected to the ball nut assembly 102 by a force transmission means other than the pulley assembly 138.

The ball nut assembly 102 is operatively connected with the screw portion 130 of the steering member 124 in a known manner. The ball nut assembly 102 effects the linear movement of the steering member 124 upon rotation of the steering wheel 110. As discussed, the power source 136 is operated in response to rotation of the steering wheel 110 and the ball nut assembly 102 is driven by the power source 136 via the pulley assembly 138. When the ball nut assembly 102 is driven, the ball nut assembly 102 rotates and, because the ball nut assembly 102 is linearly fixed in position on the housing design axis 126, the steering member 124 moves linearly. The linear movement of the steering member 124 effects steering movement of the first and second steerable wheels 106A and 106B, respectively, of the vehicle. The power source 136 thus provides steering assistance in response to the applied steering torque.

In the event of the inability of the power source 136 to effect the linear movement of the steering member 124, a mechanical connection between the gear teeth on the pinion 122 and the rack teeth on the rack portion 128 of the steering member 124 permits manual steering of the vehicle. The pinion 122 and the rack portion 128 cooperate to convert rotation of the steering wheel 110 around the steering axis 112 into linear movement of the steering member 124 along the housing design axis 126.

Figure 3:
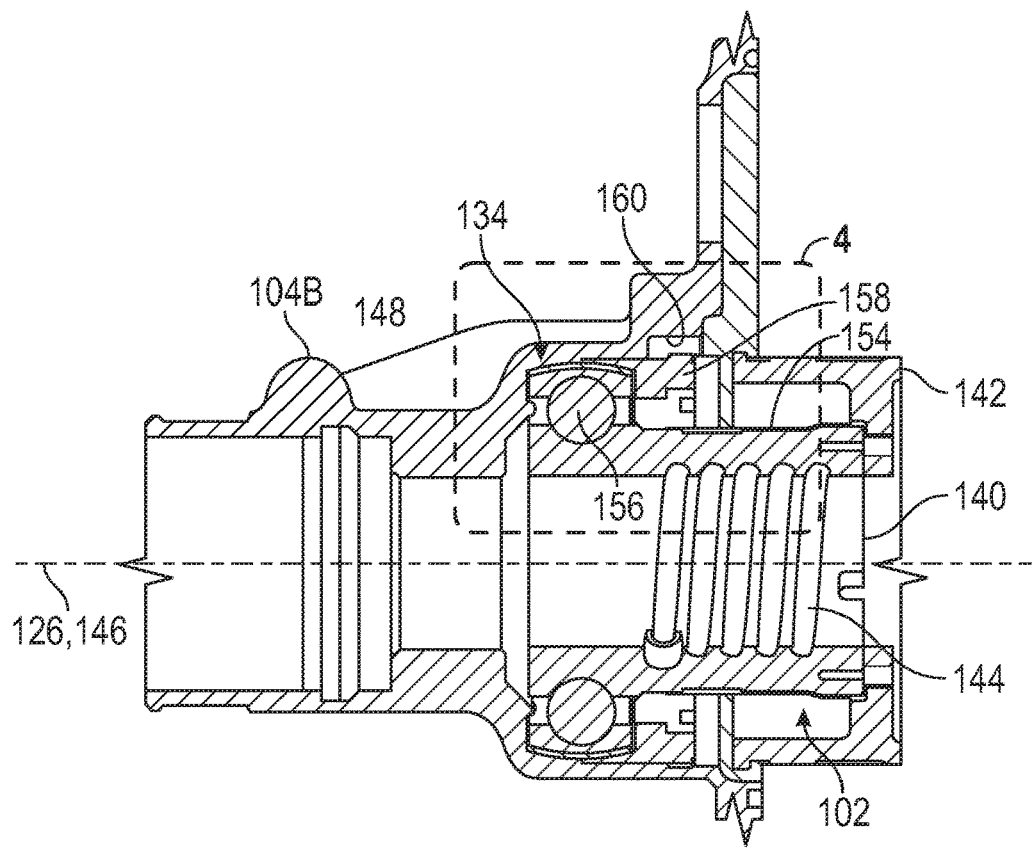
FIG. 3 is a partial section view of the ball nut assembly of FIG. 1.
Figure 4:
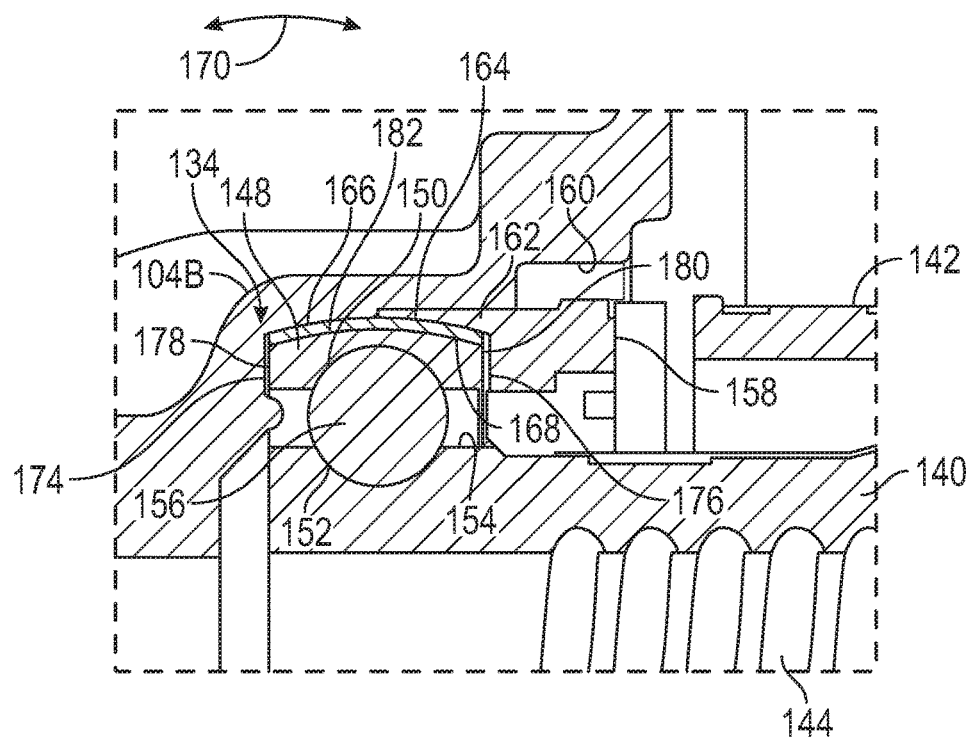
FIG. 4 is an enlarged portion of FIG. 3.

Referring now to FIGS. 3 and 4, there is illustrated the ball nut assembly 102 and its bearing assembly 134 in detail. As discussed, the ball nut assembly 102 also includes the ball nut 140. The ball nut 140 has internal thread convolutions 144, encircles the steering member 124 (not shown in FIGS. 3 and 4), and extends cylindrically along a longitudinal ball nut axis 146. The steering member 124 also extends along the ball nut axis 146. As discussed, the ball nut 140 rotates on the steering member 124 to produce linear movement of the steering member 124 along the ball nut axis 146.

In FIG. 3, the ball nut axis 146 is illustrated as co-linear with the housing design axis 126. The ball nut axis 146 being co-linear with the housing design axis 126 is an ideal or design position of the ball nut axis 146 relative to the housing design axis 126. As will be discussed, the ball nut axis 146 and housing design axis 126 are commonly other than co-linear because of allowable tolerances in the housing 104.

As discussed, the ball nut assembly 102 is supported on the housing 104 by the bearing assembly 134. As illustrated, the bearing assembly 134 is a single row ball type bearing and includes an outer race member 148 with an outer race 150, an inner race 152 in an external surface 154 of the ball nut 140, and a plurality of force transmitting members 156 between the outer and inner races 150 and 152, respectively. The outer race member 148 is preferably a continuous, annular member encircling the ball nut 140 and fixed to the housing 104. As will be discussed, the outer race member 148 is concentric with the ball nut axis 146. Alternatively, the outer race member may be other than a continuous member or as illustrated.

A spanner nut 158 screws onto threads provided in a cylindrical inner surface 160 of the housing 104. The spanner nut 158 includes threads corresponding to the threads provided in the housing inner surface 160. The spanner nut 158 further includes an extension portion 162 with an abutment surface 164. During assembly, the spanner nut 158 is operative to load the bearing assembly 134 via the abutment surface 164. Once assembled, the bearing assembly 134 is operative to support the ball nut 140 for rotation on the steering member 124.

A first arcuate surface 166 is defined on the housing inner surface 160 and the abutment surface 164 such that the first surface 166 is between the ball nut assembly 102 and the housing 104. The first surface 166 is arcuate with a concave section in a direction along the ball nut axis 146. The concave section faces towards the ball nut axis 146. The first surface 166 may have a constant or varying radius. The first surface 166 is a circumferential, annular structure on the inner surface 160. With a concave section, the first surface 166 is an annular recess into the inner surface 160. However, when the first surface 166 has other than a concave section, the first surface 166 is also other than a recess into the inner surface 160. The first surface 166 encircles the housing design axis 126 and the ball nut axis 146. As illustrated, the first surface 166 is concentric with the housing design axis 126. Alternatively, the first surface 166 may be other than concentric with the housing design axis 126.

A second arcuate surface 168 is defined on the bearing assembly 134, specifically on the outer race member 148. The second surface 168 is arcuate with a convex section in a direction along the ball nut axis 146. The convex section faces away from the ball nut axis 146. The second surface 168 may have a constant or varying radius. The second surface 168 is a circumferential, annular structure on the outer race member 148. With a convex surface, the second surface 168 is an annular protrusion from the outer race member 148. However, when the second surface 168 has other than a convex section, the second surface 168 is also other than a protrusion from the outer race member 148. The second surface 168 encircles the housing design axis 126 and the ball nut axis 146. As illustrated, the second surface 168 is concentric with the ball nut axis 146, as is the outer race member 148. Alternatively, the second surface 168 may be other than concentric with the ball nut axis 146.

The convex section of the second surface 168 is defined to be complimentary to the concave section of the first surface 166. As a non-limiting example, the first and second surfaces 166 and 168, respectively, may be defined as portions of two contacting spheres having the same center. As illustrated, the first surface 166 has a concave section and the second surface 168 has a convex section. Alternatively, the first surface 166 may have other than a concave section and/or the second surface 168 may have other than a convex section. As a non-limiting example, both the first and second surfaces 166 and 168, respectively, may have convex sections.

The second surface 168 rotates, slides, or otherwise moves on the first surface 166 along an arc 170 in a plane. The housing design axis 126 and the ball nut axis 146 also both lie in the plane. The second surface 168 rotating on the first surface 166 results in the ball nut assembly 102 rotating on a rotation axis 172 (shown in FIG. 2) while the housing 104 remains in position i.e., the housing 104 is rotationally fixed on the rotation axis 172. The housing design axis 126, ball nut axis 146, and rotation axis 172 all intercept at a single point. As illustrated, the rotation axis 172 is perpendicular to the ball nut axis 146. Alternatively, the rotation axis 172 may be otherwise transverse to the ball nut axis 146.

Rotation of the ball nut assembly 102 on the rotation axis 172 results in different portions of the second surface 168 rotating in different directions along the arc 170. For example, a first portion of the second surface 168 illustrated as above the ball nut axis 146 in FIG. 3 may rotate in a first direction along the arc 170 and a second portion of the second surface 168 illustrated as below the ball nut axis 146 in FIG. 3 may rotate in a second direction along the arc 170 that is opposite the first direction.

As such, a position of the ball nut assembly 102 may "float," pitch, move, or otherwise be adjusted relative to the housing 104. Such float may, as a non-limiting example, be used to properly align the components—e.g., the steering member 124—of the power steering assembly 100 in the housing 104 during assembly of the power steering assembly 100. Alignment of the steering member 124 in the housing 104 may result in the ball nut assembly 102 rotating or pitching on the rotation axis 172 and the second surface 168 rotating on the first surface 166. The ball nut assembly 102 rotates or floats such that the components of the power steering assembly 100 may align with the as-built axis of the housing 104 during assembly of the power steering assembly 100.

The second surface 168 rotates on the first surface 166 along the arc 170 between first and second stop surfaces 174 and 176, respectively. As illustrated, the first stop surface 174 is provided on the housing inner surface 160 and the second stop surface 176 is provided on the spanner nut 158. Alternatively, the first and/or second stop surfaces 174 and/or 176, respectively, may be otherwise provided. Damping or other material may be provided on one or both of the first and second stop surfaces 174 and 176, respectively, to cushion or otherwise reduce any impact between the outer race member 148 and the first and second stop surfaces 174 and 176, respectively.

The second surface 168 may rotate on the first surface 166 towards the first stop surface 174 until a first side surface 178 of the outer race member 148 contacts the first stop surface 174. Similarly, the second surface 168 may rotate on the first surface 166 towards the second stop surface 176 until a second side surface 180 of the outer race member 148 contacts the second stop surface 176. The first and second stop surfaces 174 and 176, respectively, limit rotation of the ball nut 140 and the ball nut assembly 102 on the rotation axis 172.

As illustrated, a bearing 182 is provided between the first and second surfaces 166 and 168, respectively, such that the first and second surfaces 166 and 168, respectively, are in contact through the bearing 182. As a non-limiting example, the bearing 182 may be fabricated from a polymer material. Alternatively, the bearing 182 may be omitted, in which case the first and second surfaces 166 and 168, respectively, would be in direct contact with each other.

The belt of the pulley assembly 138 is provided such that the pulley assembly 138 continues transmitting power to the ball nut assembly 102 when the second surface 168 rotates on the first surface 166. For example, the belt may be an elastic material placed under tension.

As illustrated, the first surface 166 is defined on the housing inner surface 160 and the abutment surface 164. Alternatively, the first surface 166 may be defined on the housing inner surface 160 only. As a non-limiting example, the extension portion 162 and the abutment surface 164 may omitted with the housing inner surface 160 extending into where the extension portion 162 is illustrated. Thus, the housing inner surface 160 would provide radial and axial support to the bearing assembly 134 and the spanner nut 158 would provide only axial support to the bearing assembly 134.

As illustrated, the first and second surfaces 166 and 168, respectively, are between the bearing assembly 134 and the inner surface 160. Alternatively, the curved first and second surfaces 166 and 168, respectively, may be positioned other than as illustrated. As a non-limiting example, the first and second surfaces 166 and 168, respectively, may be between the bearing assembly 134 and the ball nut 140.

Figure 5:
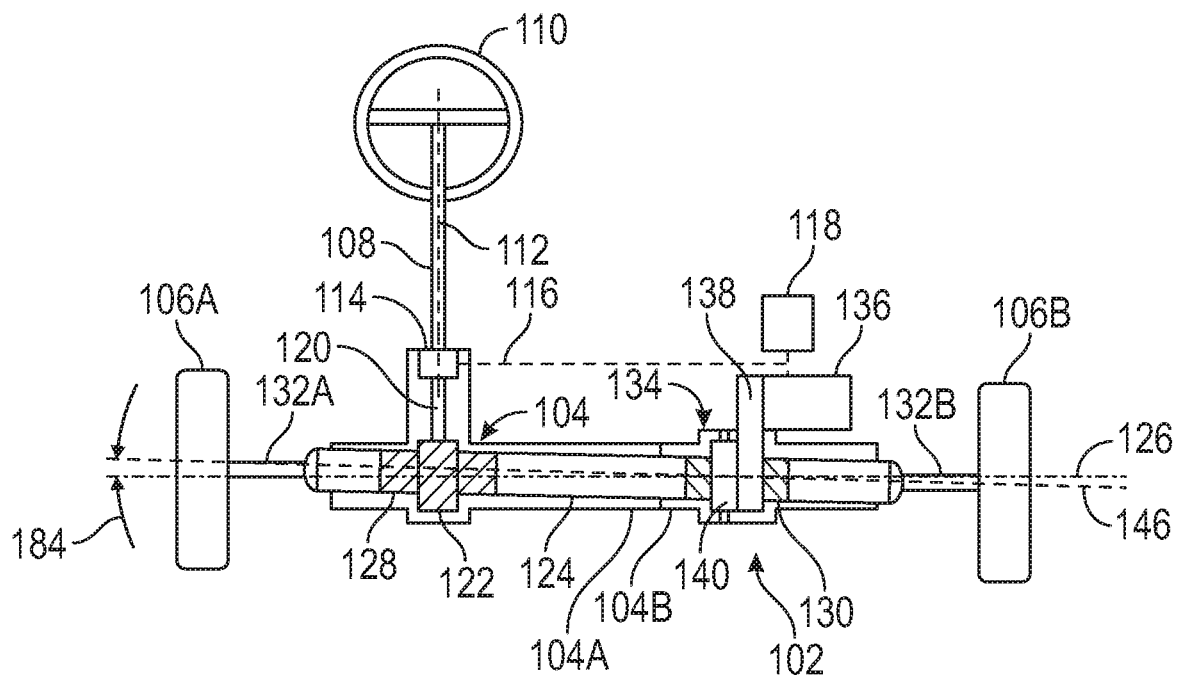
FIG. 5 is a schematic view of the power steering assembly of FIG. 1 with the ball nut assembly in a first position.
Figure 6:
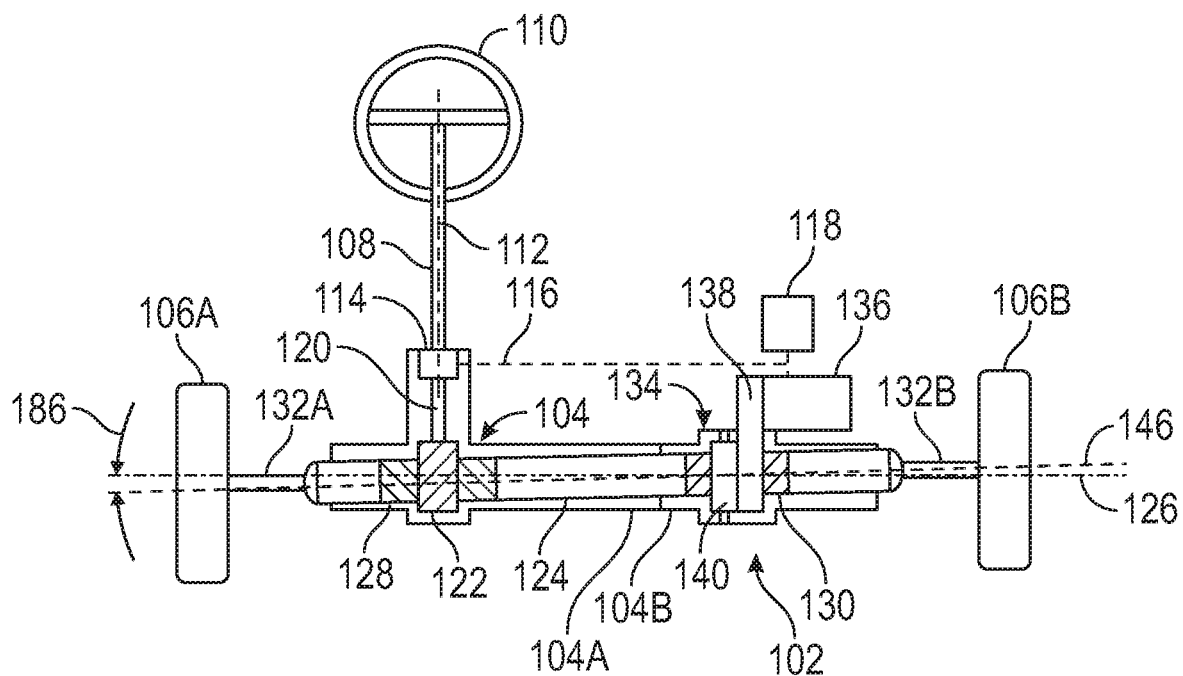
FIG. 6 is a schematic view of the power steering assembly of FIG. 1 with the ball nut assembly in a second position.

Referring now to FIGS. 5 and 6, there is illustrated non-limiting example positions of the ball nut assembly 102 when the second surface 168 has rotated on the first surface 166. FIGS. 5 and 6 are schematic and rotation of the steering member 124 and the ball nut assembly 102 is exaggerated for clarity.

Specifically, FIG. 5 illustrates the position of the ball nut assembly 102 when the second surface 168 has rotated on the first surface 166 until the first side surface 178 has contacted the first stop surface 174. In FIG. 5, the steering member 124 and the ball nut assembly 102 have rotated together. As a result, the housing design axis 126 and the ball nut axis 146 are no longer co-linear. Instead, there is a first deflection or pitch 184 between the housing design axis 126 and the ball nut axis 146 such that the components of the power steering assembly 100 may align with the as-built axis of the housing 104 during assembly of the power steering assembly 100. As a non-limiting example, the first deflection 184 may have an absolute value of 0.5 degrees.

Similarly, FIG. 6 illustrates the position of the ball nut assembly 102 when the second surface 168 has rotated on the first surface 166 until the second side surface 180 has contacted the second stop surface 176. Again, in FIG. 6, the steering member 124 and the ball nut assembly 102 have rotated together. As a result, the housing design axis 126 and the ball nut axis 146 are again no longer co-linear. Instead, there is a second deflection or pitch 186 between the housing design axis 126 and the ball nut axis 146 such that the components of the power steering assembly 100 may align with the as-built axis of the housing 104 during assembly of the power steering assembly 100. As a non-limiting example, the second deflection 186 may have an absolute value of 0.5 degrees, wherein the first and second deflections 184 and 186, respectively, have opposite magnitudes.

FIGS. 5 and 6 show examples of the ball nut axis 146 rotated relative to the housing design axis 126 in a vertical plane extending between top and bottom of the vehicle having the power steering assembly 100. Alternatively, the ball nut axis 146 may rotate relative to the housing design axis 126 in a plane with any direction or orientation. As a non-limiting example, the ball nut axis 146 may rotate relative to the housing design axis 126 in a horizontal plane extending between front and back of the vehicle.

Figure 7:
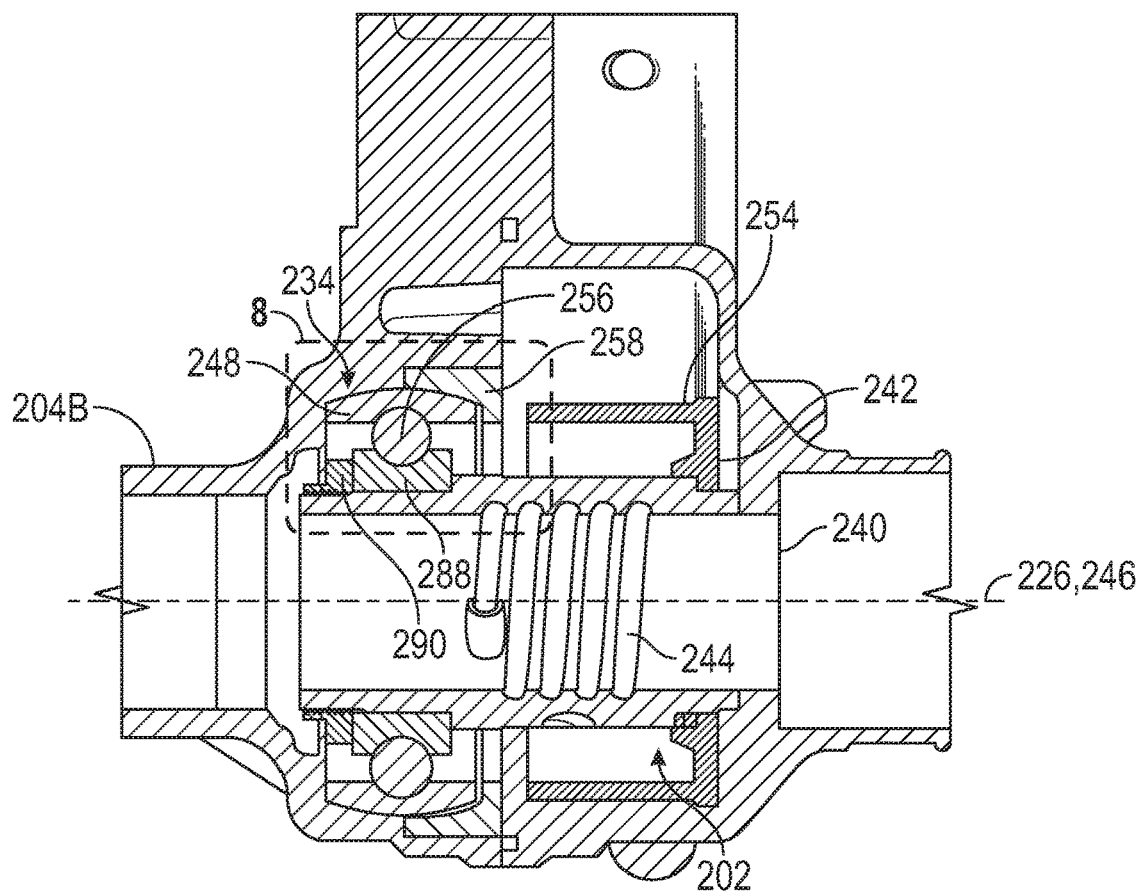
FIG. 7 is a partial section view of a second embodiment of a ball nut assembly in accordance with the present invention.
Figure 8:
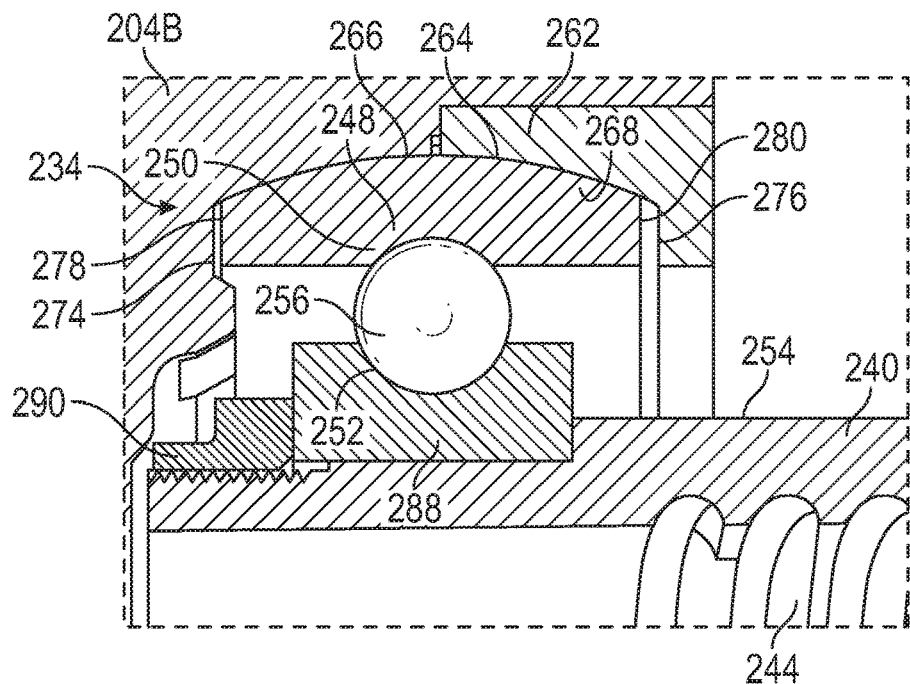
FIG. 8 is an enlarged portion of FIG. 7.

Referring now to FIGS. 7 and 8, there is illustrated a second embodiment of a ball nut assembly, indicated generally at 202, produced in accordance with the present invention. The ball nut assembly 202 of FIGS. 7 and 8 is a variation of the ball nut assembly 102 of FIGS. 1-6. As such, like reference numerals, increased by 100, designate corresponding parts in the drawings and detailed description thereof will be omitted.

The ball nut assembly 202 includes a bearing assembly 234 having an inner race member 288. An inner race 252 is formed in the inner race member 288. The inner race member 288 is secured on a ball nut 240 by a second spanner nut 290. The second spanner nut 290 screws onto threads provided in an external surface 254 of the ball nut 240.

Figure 9:
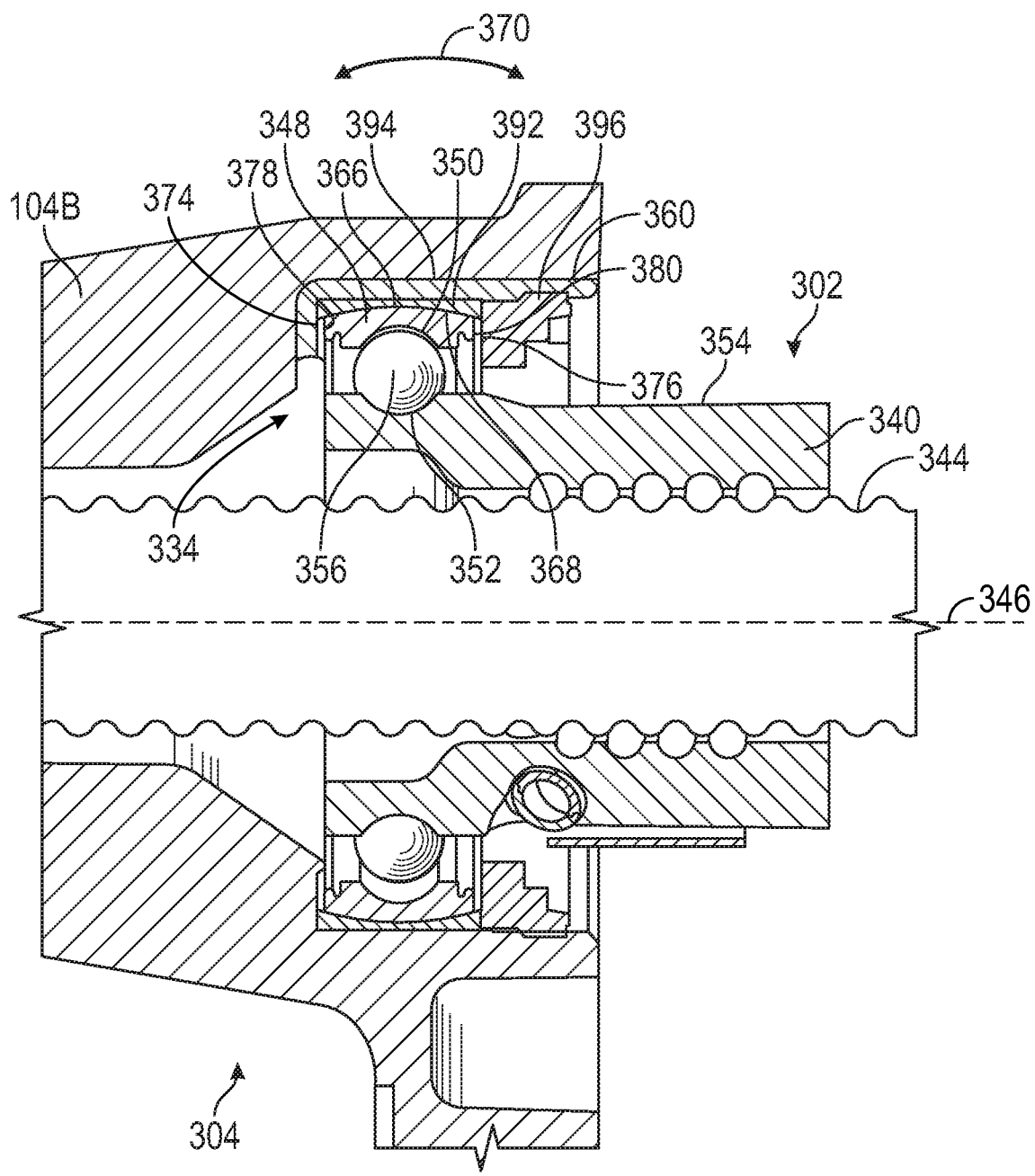
FIG. 9 is a partial section view of a third embodiment of a ball nut assembly in accordance with the present invention.

Referring now to FIG. 9, there is illustrated a third embodiment of a ball nut assembly, indicated generally at 302, produced in accordance with the present invention. The ball nut assembly 302 of FIG. 9 is a variation of the ball nut assembly 102 of FIGS. 1-6. As such, like reference numerals, increased by 200, designate corresponding parts in the drawings and detailed description thereof will be omitted.

The ball nut assembly 302 has a housing, indicated generally at 304. Positioned between the ball nut assembly 302 and the housing 304 is a housing insert 392. The housing insert 392 is preferably provided as part of a bearing assembly, indicated generally at 334. Alternatively, the housing insert 392 may be provided other than as part of the bearing assembly 334.

The housing insert 392 has an outer surface 394 that is parallel to a ball nut axis 346. The housing insert 392 also has a first surface 366 such that the first surface 366 is between the housing 304 and the ball nut assembly 302.

The ball nut assembly 302 further has a spanner nut 396. The spanner nut 396 screws onto threads provided in a cylindrical inner surface 360 of the housing 304. The spanner nut 396 includes threads corresponding to the threads provided in the housing inner surface 360. During assembly, the spanner nut 396 is operative to load the bearing assembly 334. The spanner nut 396 also secures the housing insert 392 in position in the housing 304.

Although omitted for clarity, the ball nut assembly 302 may be provided with a bearing between the first surface 366 and a second surface 368.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A power steering assembly comprising:
   a housing;
   a ball nut assembly supported on the housing and having a ball nut axis;
   a first surface between the housing and the ball nut assembly;
   a second surface of the ball nut assembly, wherein the second surface rotates on the first surface such that the ball nut assembly rotates relative to the housing on a rotation axis that is transverse to the ball nut axis; and
   first and second stop surfaces between which the second surface rotates and that limit rotational movement of the ball nut assembly relative to the housing.

2. The power steering assembly of claim 1 wherein the first surface is on the housing.

3. The power steering assembly of claim 1 wherein the first surface has a concave section in a direction of the ball nut axis, the concave section faces the ball nut axis, the second surface has a convex section in the direction of the ball nut axis, and the convex section faces away from the ball nut axis.

4. The power steering assembly of claim 1 further comprising:
   a polymer bearing between the first and second surfaces.

5. The power steering assembly of claim 1 wherein the ball nut axis and rotation axis are perpendicular.

6. The power steering assembly of claim 1 wherein the housing is rotationally fixed on the rotation axis.

7. The power steering assembly of claim 1 further comprising damping material provided on the first and second stop surfaces.

8. The power steering assembly of claim 1 wherein the first and second stop surfaces extend parallel to one another to positions radially inward of the entire second surface relative to the ball nut axis.

9. The power steering assembly of claim 1 further comprising:
   a housing insert between the housing and the ball nut assembly, wherein the first surface is on the housing insert.

10. The power steering assembly of claim 9 further comprising:
    an outer surface of the housing insert, wherein the outer surface is parallel to the ball nut axis.

11. The power steering assembly of claim 1 wherein the ball nut assembly further comprises:
    a bearing assembly, wherein the second surface is on the bearing assembly and the bearing assembly supports the ball nut assembly on the housing.

12. The power steering assembly of claim 11 wherein the bearing assembly comprises:
    a housing insert, wherein the first surface is on the housing insert; and
    an outer surface of the housing insert, wherein the outer surface is parallel to the ball nut axis.

13. The power steering assembly of claim 11 wherein the bearing assembly comprises:
    an outer race member having the second surface;
    a first race in the outer race member;
    a second race in the ball nut assembly; and
    force transmitting members between the first and second races.

14. The power steering assembly of claim 11 wherein the bearing assembly comprises:
    an outer race member having the second surface;
    a first race in the outer race member;
    an inner race member secured to a ball nut of the ball nut assembly;
    a second race in the inner race member; and
    force transmitting members between the first and second races.

15. A power steering assembly comprising:
    a housing;
    a ball nut assembly having a ball nut axis;
    a bearing assembly supporting the ball nut assembly on the housing;
    an annular first surface between the housing and the ball nut assembly;
    an annular second surface of the bearing assembly, wherein the second surface rotates on the first surface such that the ball nut assembly rotates relative to the housing on a rotation axis that is transverse to the ball nut axis;
    first and second stop surfaces between which the second surface rotates and that limit rotational movement of the ball nut assembly relative to the housing;
    a steering member extending along the ball nut axis and having a rack portion and a screw portion, wherein the ball nut assembly is operatively connected to the screw portion;
    a pinion operatively connected to the rack portion; and
    a pulley assembly operatively connecting a power source to the ball nut assembly, wherein the ball nut assembly effects linear movement of the steering member.

16. The power steering assembly of claim 15 wherein the first surface has a concave section in a direction of the ball nut axis, the concave section faces the ball nut axis, the second surface has a convex section in the direction of the ball nut axis, and the convex section faces away from the ball nut axis.

17. The power steering assembly of claim 15 further comprising:
    a polymer bearing between the first and second surfaces.

18. The power steering assembly of claim 15 wherein the bearing assembly comprises:
    an outer race member having the second surface;
    a first race in the outer race member;
    a second race in the ball nut assembly; and
    force transmitting members between the first and second races.

19. The power steering assembly of claim 15 wherein the first surface is on the housing.

20. The power steering assembly of claim 15 wherein the bearing assembly further comprises:
    a housing insert, wherein the first surface is on the housing insert; and
    an outer surface of the housing insert, wherein the outer surface is parallel to the ball nut axis.

21. The power steering assembly of claim 15 further comprising damping material provided on the first and second stop surfaces.

22. The power steering assembly of claim 15 wherein the first and second stop surfaces extend parallel to one another to positions radially inward of the entire second surface relative to the ball nut axis.

\* \* \* \* \*